(12) United States Patent
Nishimura et al.

(10) Patent No.: US 9,377,588 B2
(45) Date of Patent: Jun. 28, 2016

(54) FERRULE AND OPTICAL-FIBER-ATTACHED FERRULE

(71) Applicant: FUJIKURA LTD., Koto-ku, Tokyo (JP)

(72) Inventors: Akito Nishimura, Sakura (JP); Shota Numata, Sakura (JP)

(73) Assignee: FUJIKURA LTD., Tokyo (JP)

( * ) Notice: Subject to any disclaimer, the term of this patent is extended or adjusted under 35 U.S.C. 154(b) by 475 days.

(21) Appl. No.: 13/853,642

(22) Filed: Mar. 29, 2013

(65) Prior Publication Data

US 2013/0308910 A1 Nov. 21, 2013

(30) Foreign Application Priority Data

Apr. 2, 2012 (JP) ................. 2012-084382

(51) Int. Cl.
*G02B 6/36* (2006.01)
*G02B 6/38* (2006.01)
*G02B 6/42* (2006.01)

(52) U.S. Cl.
CPC .............. *G02B 6/381* (2013.01); *G02B 6/3829* (2013.01); *G02B 6/3885* (2013.01); *G02B 6/4292* (2013.01)

(58) Field of Classification Search
CPC ...................................... G02B 6/381
USPC .......................................... 385/78
See application file for complete search history.

(56) References Cited

U.S. PATENT DOCUMENTS

2005/0175347 A1* 8/2005 Ray et al. .................. 398/88
2009/0116793 A1  5/2009 Nishimura et al.
2009/0252455 A1 10/2009 Ohta et al.
2013/0259431 A1* 10/2013 Charbonneau-Lefort et al. ............................. 385/89
2014/0294353 A1* 10/2014 Ertel ............................. 385/93

FOREIGN PATENT DOCUMENTS

| JP | 2007-121973 A | 5/2007 |
| JP | 2009104096 A | 5/2009 |
| JP | 2009134262 A | 6/2009 |
| JP | 2009258510 A | 11/2009 |

OTHER PUBLICATIONS

Communication dated Sep. 30, 2014, issued by the Japan Patent Office in corresponding Japanese Application No. 2012-084382.

* cited by examiner

*Primary Examiner* — Hemang Sanghavi
*Assistant Examiner* — Kajli Prince
(74) *Attorney, Agent, or Firm* — Sughrue Mion, PLLC (57) ABSTRACT

A ferrule of the invention includes: a ferrule main body having a front edge and a rear edge; a fiber insertion hole into which an optical fiber is to be inserted; a recess provided at a top surface of the ferrule main body, having a reflection surface converting an optical path of a front end of the optical fiber into an optical path of a light emission-launch end provided at a lower surface side of the ferrule main body; a light emission-launch portion provided on the optical path of the light emission-launch end at a lower surface of the ferrule main body; a locating pin provided closer to the front edge than the light emission-launch portion at the lower surface of the ferrule main body; and a recessed portion provided between the locating pin at the lower surface of the ferrule main body and the light emission-launch portion.

9 Claims, 6 Drawing Sheets

FERRULE AND OPTICAL-FIBER-ATTACHED FERRULE

CROSS REFERENCE TO RELATED APPLICATIONS

This application claims priority from Japanese Patent Application No. 2012-084382 filed on Apr. 2, 2012, the content of which is incorporated herein by reference in its entirety.

BACKGROUND OF THE INVENTION

1. Field of the Invention

The present invention relates to a ferrule and an optical-fiber-attached ferrule in which a locating pin protruding from one surface thereof and an optical-path changing recess are formed at a plate-shaped transparent ferrule main body made of plastic which is to be attached to a front end of an optical fiber.

2. Background Art

As a ferrule to be attached to a front end of an optical fiber, a structure is known in which a pair of locating pins protruding from one surface thereof and an optical-path changing recess are formed at a plate-shaped transparent ferrule main body made of plastic (for example, Japanese Unexamined Patent Application, First Publication No. 2007-121973).

The ferrule is suitably used for optically splicing an optical fiber disposed along a circuit board, to an optical device serving as a light-emitting element or a light receiving element, for example, which are packaged into the circuit board, in an optical axis which is a direction perpendicular to the circuit board; and such ferrule is rapidly and widely diffused in recent years.

In the ferrule, the locating pins are fitted into the locating pin holes of the receiving member into which the optical device is packaged (for example, the above-described circuit board), the joint surface from which the locating pins of the ferrule main body protrude is connected to a ferrule-receiving surface of the receiving member, the joint surface is disposed so as to face the optical device, and the ferrule is thereby attached to the receiving member.

The optical path optically splicing the optical fiber to the optical device passes through the ferrule main body of the ferrule.

The optical path is bent and formed inside the ferrule main body of the ferrule by the optical-path changing recess.

However, in the above-described ferrule, the locating pin tends to be formed obliquely to the direction perpendicular to the joint surface of the ferrule main body.

The degree of forming precision of the locating pin affects the positioning accuracy relative to the optical device of the ferrule and results in an increase in loss.

However, until now, there is not a preferred technique of improving the inclination of the locating pin with respect to the direction perpendicular to the joint surface of the ferrule main body as a practical matter.

SUMMARY OF THE INVENTION

The invention was made with respect to the above-described problems and provides a ferrule and an optical-fiber-attached ferrule which can improve the inclination of the locating pin relative to the direction perpendicular to the joint surface of the ferrule main body at a low cost and can improve the positioning accuracy by use of the locating pin.

The invention provides the constitutions as follows in order to solve the aforementioned problem.

A first aspect of the invention provides a ferrule including: a ferrule main body having a front edge, a rear edge, and an intermediate portion located therebetween; a fiber insertion hole into which an optical fiber is to be inserted, extending between the rear edge and the intermediate portion; a recess provided at a top surface of the ferrule main body, having a reflection surface converting an optical path of a front end of the optical fiber inserted into the fiber insertion hole, into an optical path of a light emission-launch end provided at a lower surface side of the ferrule main body; a light emission-launch portion provided on the optical path of the light emission-launch end at a lower surface of the ferrule main body; a locating pin provided closer to the front edge than the light emission-launch portion at the lower surface of the ferrule main body; and a recessed portion provided between the locating pin at the lower surface of the ferrule main body and the light emission-launch portion.

A second aspect of the invention provides the ferrule according to the first aspect, wherein A/B is in a range of 0.7 to 1.3 where A represents a distance from an axis line of the locating pin to the front edge and B represents a distance from the axis line of the locating pin to the recessed portion, and wherein $C \geq 0.4 \times T$ is satisfied where T represents a ferrule height of the ferrule main body near the recessed portion and C represents a formation depth of the recessed portion.

A third aspect of the invention provides the ferrule according to the first aspect or the second aspect wherein the recessed portion on the lower surface of the ferrule main body has a curved inner surface between the front-inner surface and both sides of an inside surface in a ferrule width direction.

A fourth aspect of the invention provides the ferrule according to any one of the first aspect, the second aspect, and the third aspect, wherein the recessed portion on the lower surface of the ferrule main body has a bottom surface following the lower surface of the ferrule main body.

A fifth aspect of the invention provides the ferrule according to any one of the first aspect, the second aspect, the third aspect, and the fourth aspect, wherein the recessed portion on the lower surface of the ferrule main body has a rear-inclined inner surface which is gradually separated from a connection surface while approaching a front side from a rear edge, the recess of the top surface of the ferrule main body has a front-inner surface which gradually approximates to the connection surface while approaching a back side from a front edge, and the rear-inclined inner surface of the recess close to the connection surface is formed substantially parallel with the front-inner surface of the recess on the opposite side of the connection surface.

A sixth aspect of the invention provides an optical-fiber-attached ferrule including a ferrule into which a front-end portion of an optical fiber is securely inserted, the ferrule including: a ferrule main body having a front edge, a rear edge, and an intermediate portion located therebetween; a fiber insertion hole into which an optical fiber is to be inserted, extending between the rear edge and the intermediate portion; a recess provided at a top surface of the ferrule main body, having a reflection surface converting an optical path of a front end of the optical fiber inserted into the fiber insertion hole, into an optical path of a light emission-launch end provided at a lower surface side of the ferrule main body; a light emission-launch portion provided on the optical path of the light emission-launch end at a lower surface of the ferrule main body; a locating pin provided closer to the front edge than the light emission-launch portion at the lower surface of the ferrule main body; and a recessed portion provided between the locating pin at the lower surface of the ferrule main body and the light emission-launch portion.

A ferrule includes: a ferrule main body having a front edge, a rear edge, a top surface and a lower surface; a fiber insertion hole, extending into the ferrule main body from the rear edge of the ferrule main body; a first recess provided in the top surface of the ferrule main body, the first recess including a reflection surface which is a rear surface of the first recess. The reflection surface reflects light on an optical path between the fiber insertion hole and a light emission-launch portion; the light emission-launch portion provided in the lower surface of the ferrule main body; a locating pin extending outward from the lower surface of the ferrule main body and disposed between the light emission launch portion and the front edge of the ferrule main body; and a second recess provided in the lower surface of the ferrule main body and disposed between the light emission-launch portion and the locating pin.

In the above-described ferrule, A is a distance from an axis line of the locating pin to the front edge of the ferrule main body, B is a distance from the axis line of the locating pin to a front surface of the second recess, and 0.7≤A/B≤1.3; and T is a height of the ferrule from the top surface of the ferrule main body to the lower surface of the ferrule main body, C is a depth of the second recess from the lower surface of the ferrule main body to a topmost portion of the second recess, and C≥0.4T.

In the above-described ferrule, when viewed from the lower surface of the ferrule main body, a corner between a front surface of the second recess and a first side of the second recess and a corner between the front surface of the second recess and a second side of the second recess are curved.

In the above-described ferrule, a topmost surface of the second recess is substantially parallel to the lower surface of the ferrule main body.

In the above-described ferrule, a rear surface of the second recess is inclined with respect to the top surface of the ferrule main body such that a distance between a rearmost portion of the rear surface of the second recess and the top surface is smaller than a distance between a frontmost portion of the rear surface of the second recess and the top surface, and the rear surface of the second recess is substantially parallel to a front surface of the first recess.

An optical-fiber-attached ferrule includes: a ferrule and an optical fiber. A front end portion of the optical fiber is securely inserted into the ferrule. The ferrule includes: a ferrule main body having a front edge, a rear edge, a top surface and a lower surface; a fiber insertion hole into which the front end portion of the optical fiber is inserted wherein the fiber insertion hole extends into the ferrule main body from the rear edge of the ferrule main body; a first recess provided in the top surface of the ferrule main body, the first recess including a reflection surface which is a rear surface of the first recess, wherein the reflection surface reflects light on an optical path between the front end portion of the optical fiber and a light emission-launch portion; the light emission-launch portion provided in the lower surface of the ferrule main body; a locating pin extending outward from the lower surface of the ferrule main body and disposed between the light emission launch portion and the front edge of the ferrule main body; and a second recess provided in the lower surface of the ferrule main body and disposed between the light emission-launch portion and the locating pin.

A ferrule includes: a main body; a fiber insertion hole extending into the main body from a rear edge of the main body; a light emission-launch portion provided on a lower surface of the main body; a first recess provided in a top surface of the main body, the first recess including a rear surface which is inclined with respect to the top surface of the main body, wherein light on an optical path within the main body between the fiber insertion hole and the light emission-launch portion is totally internally reflected at the rear surface of the first recess; a locating pin extending from a lower surface of the main body and disposed between the light emission-launch portion and a front edge of the main body; and a second recess provided in the lower surface of the main body and disposed between the light emission-launch portion and the locating pin.

In the above-described ferrule, the first recess includes a front surface which is inclined with respect to the top surface of the main body, the second recess includes a rear surface which is inclined with respect to the lower surface of the main body, and the front surface of the first recess is substantially parallel to the rear surface of the second recess.

In the above-described ferrule, the locating pin is a first locating pin and the ferrule further includes a second locating pin extending from the lower surface of the main body and disposed between the light emission-launch portion and the rear edge of the main body.

In the above-described ferrule, both the first locating pin and the second locating pin are substantially perpendicular to the lower surface of the main body.

Effects of the Invention

According to the invention, it is possible to improve the inclination of the locating pin relative to the direction perpendicular to the joint surface of the ferrule main body at a low cost and improve the positioning accuracy by use of the locating pin.

DETAILED DESCRIPTION OF THE INVENTION

Hereinafter, a ferrule and an optical-fiber-attached ferrule of an embodiment of the invention will be described with reference to drawings.

As shown in FIGS. 1 to 4, a ferrule 10 is an integral molding article made of a transparent plastic possessing the refractive index greater than that of air such as acrylate resin or the like.

The ferrule 10 substantially has a structure in which a fiber insertion hole 12 into which the front-end portion of the optical fiber 1 is securely inserted, an optical-path changing recess 13, and a shaping-adjustment recess 16 (resin contraction adjustment recess) are formed on a plate-shaped ferrule main body 11.

In addition, the ferrule 10 has a pair of locating pins 15a and 15b protruding from a joint surface 18 that is one surface the ferrule main body 11.

Figure 4:
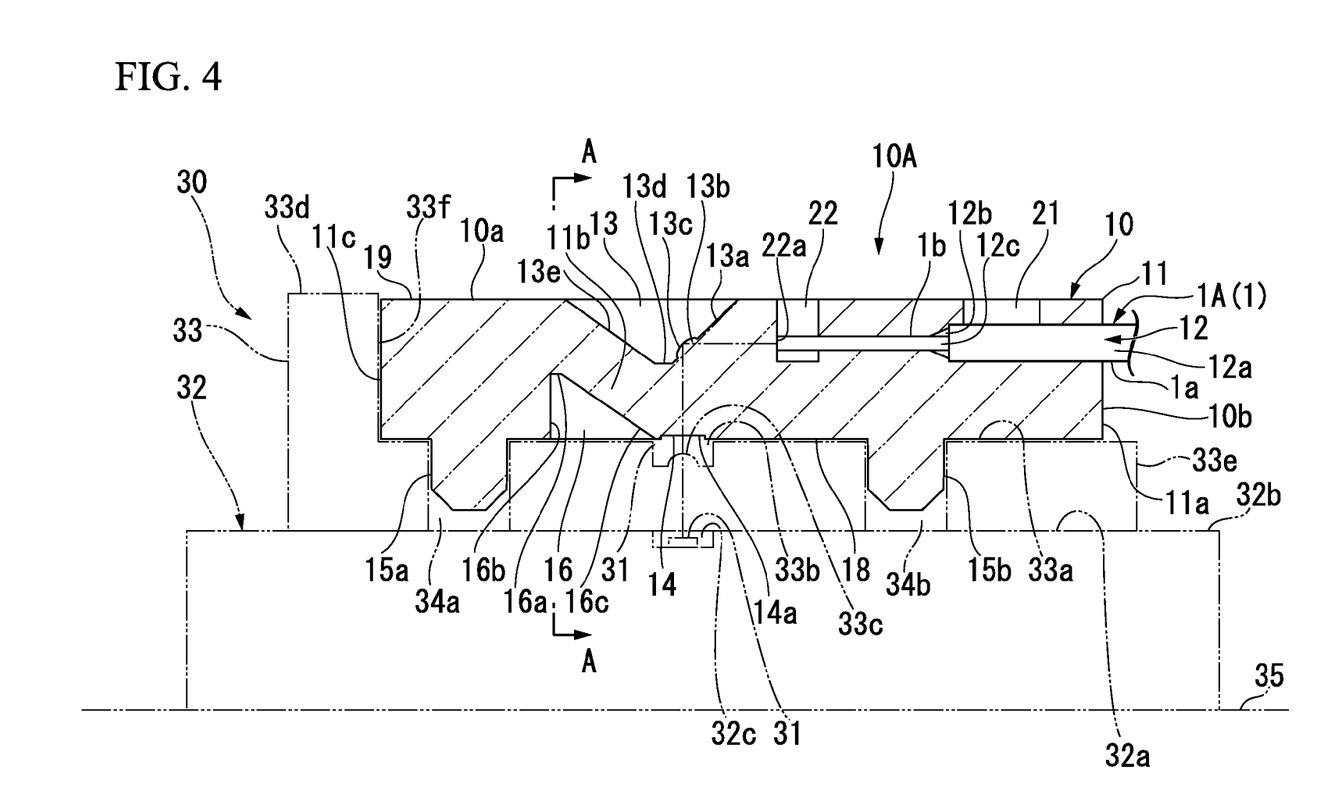
FIG. 4 is a cross-sectional view showing an inner structure of the ferrule and the optical-fiber-attached ferrule of FIG. 1.

As shown in FIG. 4, the joint surface 18 (connection surface) of the ferrule 10 is, for example, attached and connected to a ferrule-receiving surface 33a of a ferrule-receiving unit 30 on which an optical device 31 serving as a light-emitting element or a light receiving element is provided.

The ferrule main body 11 of the ferrule 10 shown as an example is a rectangular plate, and the joint surface 18 is formed in a rectangular shape extending along the longitudinal direction of the ferrule main body 11.

Furthermore, the ferrule 10 has a groove portion 14, which is formed so as to extend in the width direction of the joint surface which is a direction perpendicular to the longitudinal direction of the joint surface 18 (hereinbelow, refer to width direction of the ferrule main body), at the center portion of the joint surface 18 in the longitudinal direction thereof.

The pair of the locating pins 15a and 15b of the ferrule 10 are provided at both sides thereof in the longitudinal direction of the joint surface 18 (the longitudinal direction of the ferrule main body) with the groove portion 14 interposed therebetween.

Each of the locating pins 15a and 15b is located at the center portion of the joint surface 18 in the width direction.

Each of the locating pins 15a and 15b is formed integrally with the ferrule main body 11.

The ferrule 10 is an integral molding article made of a transparent plastic including the pair of the locating pins 15a and 15b as a whole.

The front-end portion of the optical fiber 1, which is inserted into the fiber insertion hole 12 of the ferrule main body 11, is securely inserted into the ferrule main body 11 of the ferrule 10 shown in FIGS. 1 to 4 as an example in the direction along the joint surface 18.

The optical fiber 1 shown as an example is an optical fiber ribbon 1A.

Bare optical fibers 1b open at the front end of the optical fiber ribbon 1A.

FIGS. 1 to 4 show an optical-fiber-attached ferrule 10A which is formed by securely inserting the optical fiber 1 into the ferrule 10.

Figure 3A:
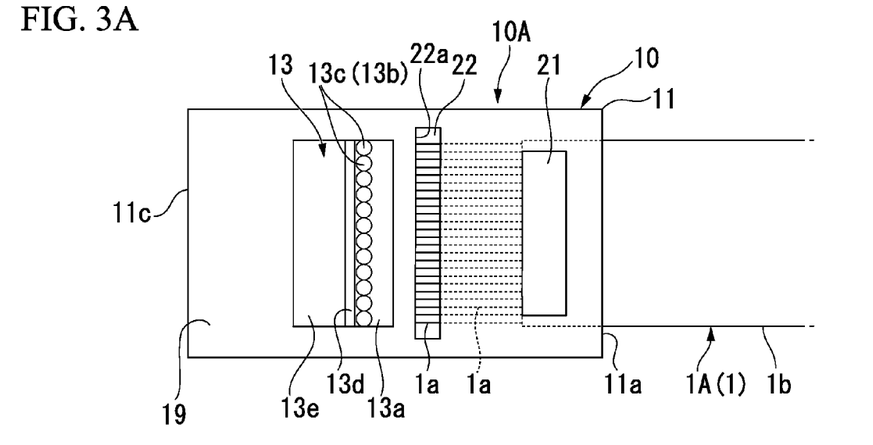
FIG. 3A is a view showing the exterior structure of the ferrule and the optical-fiber-attached ferrule of FIG. 1 and is a plan view showing an exterior structure as seen from the back side thereof.
Figure 6:
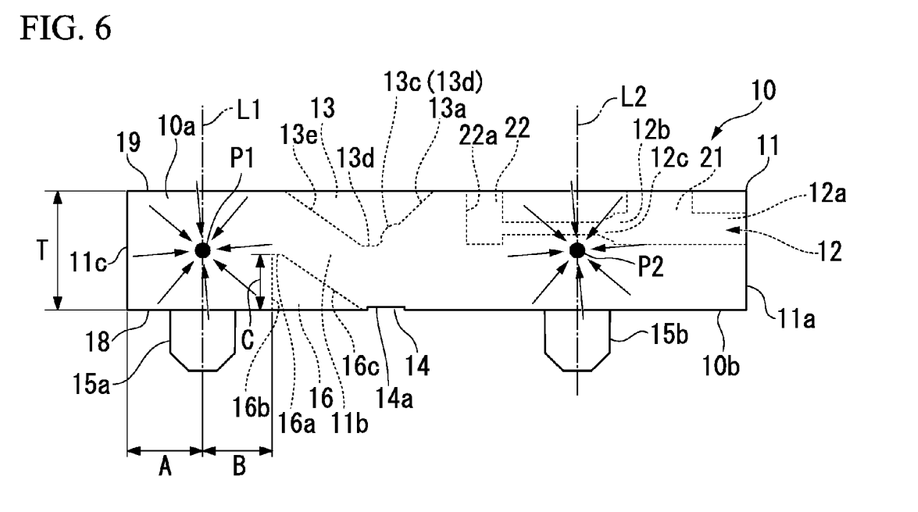
FIG. 6 is a model diagram schematically illustrating the location of the contraction center which is caused by solidifying a molding resin in the process of resin-molding a ferrule of FIG. 1.

As shown in FIGS. 3A, 4, and 6, the fiber insertion hole 12 has a coated-portion-containing hole portion 12a which is formed toward the front-edge side on the opposite side of the rear-edge face 11a from the edge face (rear-edge face 11a) of one side of the ferrule main body 11 in the longitudinal direction thereof.

The front-end portion of a tape-shaped coated portion 1a which is formed by collectively coating a plurality of bare optical fibers 1b of the optical fiber ribbon 1A with a coating material is securely inserted into the coated-portion-containing hole portion 12a.

Figure 1:
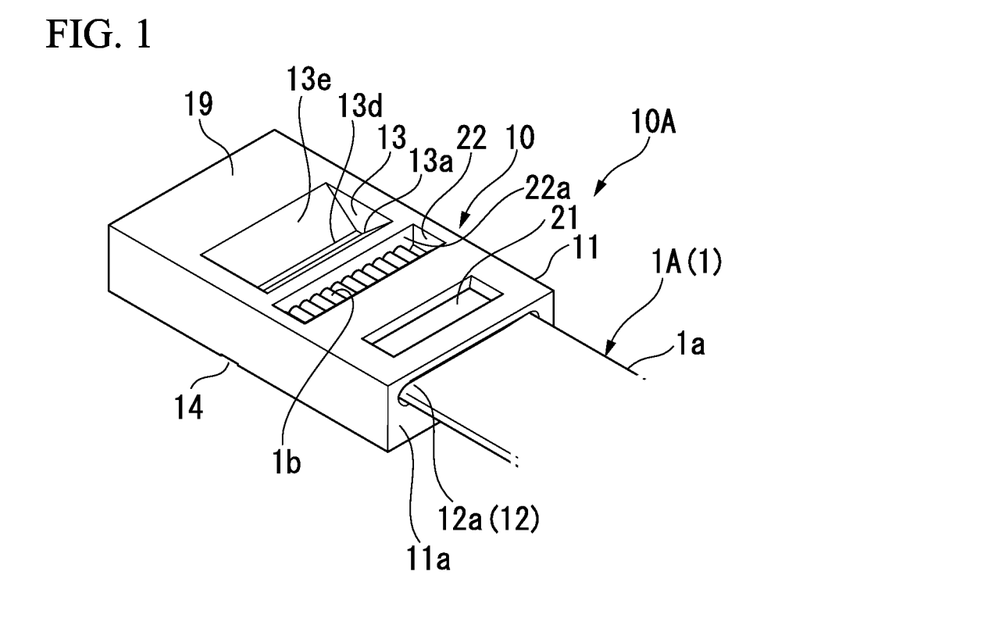
FIG. 1 is a perspective view showing a back-side exterior structure of a ferrule and an optical-fiber-attached ferrule of an embodiment related to the invention as seen from the back side of the ferrule.

As shown in FIGS. 1, 4, and 6, the coated-portion-containing hole portion 12a that has an elongated cross-sectional shape extending along the width direction of the ferrule main body is formed so as to extend along the longitudinal direction of the ferrule main body.

The front-end portion of the coated portion 1a of the optical fiber ribbon 1A is inserted into the coated-portion-containing hole portion 12a so that the tape width direction thereof coincides with the longitudinal direction of the cross section of the coated-portion-containing hole portion 12a (i.e., the width direction of the ferrule main body), and the front-end portion of the coated portion 1a is adhesively-fixed to the ferrule main body 11 by an adhesive filling up the coated-portion-containing hole portion 12a.

As shown in FIGS. 1, 3A, 6, or the like, an adhesive-injection window hole 21, which is hollowed on a back face 19 (top surface) on the opposite side of the joint surface 18 and which reaches the coated-portion-containing hole portion 12a, is formed at the back-edge portion of the ferrule main body 11.

It is possible to inject the adhesive from the outside of the ferrule main body 11 to the coated-portion-containing hole portion 12a through the adhesive-injection window hole 21 and fill the coated-portion-containing hole portion 12a with the adhesive.

As shown in FIGS. 4 and 6, the fiber insertion hole 12 includes: tapered hole portions 12b whose height is gradually reduced and which are formed so as to be directed toward the front side of the ferrule main body (toward the left sides of FIGS. 4 and 6) from a plurality of portions of the ferrule main body in the width direction thereof at the front edge of the coated-portion-containing hole portion 12a; and a fiber positioning hole portion 12c which is formed so as to extend from the front edge of each tapered hole portion 12b to the front side of the ferrule main body.

A plurality of the fiber positioning hole portions 12c are laterally formed and arrayed in the width direction of the ferrule main body.

The front edge of each fiber positioning hole portion 12c reaches a hollow groove 22 which is hollowed on the back face 19 of the ferrule main body at a position which is displaced from the adhesive-injection window hole 21 to the front side of the ferrule main body.

The hollow groove 22 is formed so as to extend in the width direction of the ferrule main body.

Each of the bare optical fibers 1b opening at the front end of the optical fiber ribbon 1A protrudes from the front edge of the fiber positioning hole portion 12c to the hollow groove 22 through the tapered hole portion 12b and the fiber positioning hole portion 12c.

One of the bare optical fibers 1b separately passes through one of the fiber positioning hole portions 12c.

The front end of each bare optical fiber 1b is in contact with a fiber opposed face 22a which is an inner wall located at the front side of the hollow groove 22.

In other cases, the bare optical fibers 1b may be arranged so that the front end thereof is slightly separated from the fiber opposed face 22a to the back side of the ferrule main body 11 (toward the right sides of FIGS. 4 and 6) while the front end thereof is not brought into contact with the fiber opposed face 22a.

When securely inserting the front-end portion of the optical fiber ribbon 1A into the ferrule 10, the optical fiber ribbon 1A together with the bare optical fibers 1b which are exposed at the front end thereof in advance are inserted into an empty fiber insertion hole 12 of the ferrule 10 in which air is only present (refer to FIG. 6).

The optical fiber ribbon 1A is inserted into the fiber insertion hole 12 through a rear-end opening portion of the fiber insertion hole 12 (the rear-end opening portion of the coated-portion-containing hole portion 12a) which opens at the rear-edge face 11a of the ferrule main body.

Subsequently, each front end of the bare optical fibers 1b of the optical fiber ribbon 1A is fed into each of the fiber positioning hole portions 12c through the tapered hole portion 12b, and the front end of the bare optical fiber 1b is brought into contact with the fiber opposed face 22a; in this state, the coated portion 1a is adhesively-fixed to the ferrule main body 11 by use of the adhesive provided in the coated-portion-containing hole portion 12a.

The bare optical fibers 1b of the optical fiber 1 is positioned by the fiber positioning hole portions 12c so that the optical axis of the front end thereof extends substantially along the joint surface 18.

A structure may be adopted in which the front-end portion of the optical fiber 1 is securely inserted into the fiber insertion holes 12 in the direction parallel to the joint surface 18 so that, for example, the optical axis of the front ends of the bare optical fiber 1b become parallel to the joint surface 18; it is not limited to this structure.

The fiber insertion hole 12 may be formed obliquely to the joint surface 18 so that, for example, the distance from the joint surface 18 gradually increases while approaching the back side of the ferrule main body 11 (toward the right sides of FIGS. 3A to 3C and 4).

The front-end portion of the optical fiber 1 including the bare optical fibers 1b opening at the front end is securely inserted into the fiber insertion hole 12 so as to be oblique to the joint surface 18 so that the distance from the joint surface 18 gradually increases while approaching the back side of the ferrule main body.

The internal side of the hollow groove 22 may be filled with, for example, a liquid-state refractive index filler such as silicone oil or the like, and the bare optical fibers 1b disposed in the hollow groove 22 may be embedded in the internal side thereof with the index matching material.

As an embodiment of the optical fiber 1, an embodiment can be adopted in which the opening portion of the hollow groove 22 is sealed on the back face 19 of the ferrule main body by attaching a cover member such as a cover glass or the like covering the hollow groove 22 to, for example, the ferrule main body 11 in the case where the index matching material is provided inside the hollow groove 22.

Furthermore, as an embodiment of the ferrule 10, an embodiment can be adopted in which the front end of the bare optical fiber 1b is disposed in the air of the internal side of the hollow groove 22 without filling the hollow groove 22 with a refractive index filler.

As shown in FIGS. 1 to 4, the optical-path changing recess 13 is formed in a grooved shape which extends in the width direction of the ferrule main body and which is hollowed on the back face 19 of the ferrule main body at the center portion in the longitudinal direction of the ferrule main body 11 (intermediate portion).

Additionally, the optical-path changing recess 13 is positioned between two portions of the locating pins 15a and 15b separated from each other in the longitudinal direction of the ferrule main body (front-back direction).

The optical-path changing recess 13 is located closer to the front side of the ferrule main body than the hollow groove 22.

The hollow groove 22 is located between the optical-path changing recess 13 and the adhesive-injection window hole 21.

Figure 3B:
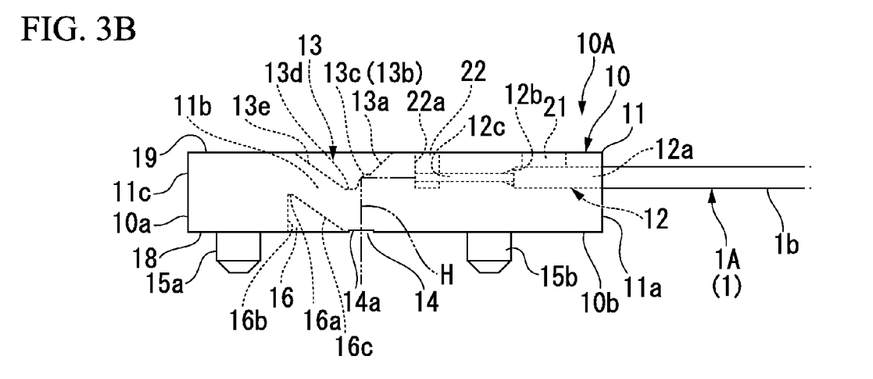
FIG. 3B is a side view showing the exterior structure of the ferrule and the optical-fiber-attached ferrule of FIG. 1.

As shown in FIGS. 3B and 4, the optical-path changing recess 13 forms a bent optical path H in which the launched light or the emitted light at the front ends of the optical fibers 1 (the front ends of the bare optical fibers 1b) is reflected due to the refractive index difference between air in the internal side thereof and the ferrule main body 11 and which passes through the groove portion 14 close to the joint surface 18.

The optical path H is formed so that the part thereof passing through the groove portion 14 extends in the direction substantially along a virtual perpendicular line perpendicular to the joint surface 18.

As shown in FIGS. 3A, 3B, and 4, an inner surface 13a (hereinbelow, refer to rear-inclined inner surface) is formed close to the hollow groove 22 of the optical-path changing recess 13 so as to be oblique to the joint surface 18 so that the distance from the joint surface 18 to the inner surface 13a gradually increases while approaching the back side of the ferrule main body.

The fiber insertion hole 12 is formed so as to determine the positions thereof and the directions thereof relative to the ferrule main body 11 so that the rear-inclined inner surface 13a of the optical-path changing recess 13 is located on the optical axes of the front end of the bare optical fibers 1b, which are positioned by the fiber positioning hole 12c.

Figure 2:
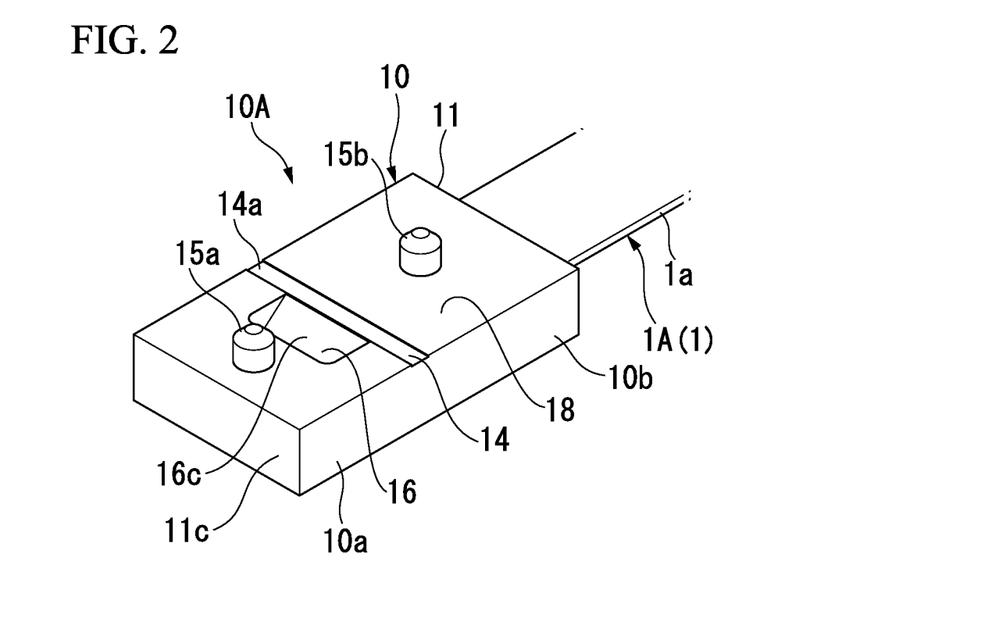
FIG. 2 is a perspective view showing a connection-surface-side (joint surface side) exterior structure of the ferrule and the optical-fiber-attached ferrule of FIG. 1 as seen from the front side of the ferrule.

As shown in FIGS. 2 and 4, a bottom surface 13d (groove bottom surface) extending from the front edge of the rear-inclined inner surface 13a toward the joint surface 18 is formed at the front side (the front side of the ferrule main body) of the rear-inclined inner surface 13a of the optical-path changing recess 13.

Additionally, a front-inner surface 13e is formed at the front side of the bottom surface 13d so as to be oblique to the joint surface 18 so that the distance from the joint surface 18 to the front-inner surface 13e gradually increases while approaching the front side of the ferrule main body 11 from the front edge of the bottom surface 13d.

However, the optical-path changing recess 13 is not limited to the constitution shown as an example.

The front-inner surface 13e is not limited to the inclined surface (front-side oblique inner surface) which is oblique to the joint surface 18 and which is formed such that the distance from the joint surface 18 to the inclined surface gradually increases while approaching the front side of the ferrule main body 11; and a surface (front-side vertical inner surface) may be formed perpendicular to the front-back direction of the ferrule main body which coincides with the longitudinal direction of the joint surface 18.

Furthermore, as a structure of the optical-path changing recess 13, a structure may be adopted in which the front-side oblique inner surface or the front-side vertical inner surface extends from the front edge of the rear-inclined inner surface 13a without forming the bottom surface 13d.

As shown in FIGS. 3A and 4, a lens portion 13b which bulges outward into the inside of the optical-path changing recess 13 and which has a concave curved-outer surface as seen from the optical fiber 1 and the groove portion 14 is formed at the rear-inclined inner surface 13a and at the position corresponding to the front end of the bare optical fiber 1b.

A plurality of the lens portions 13b are formed at a plurality of portions so as to correspond to a plurality of the bare optical fibers 1b and arrayed in the width direction on the rear-inclined inner surface 13a of the ferrule main body.

The lens portions 13b are formed integrally with the ferrule main body 11.

In the ferrule 10, a curved-outer surface 13c of the lens portion 13b functions as a reflection surface (reflection surface for changing an optical axis) which reflects the launched light or the emitted light at the front end of the optical fiber 1 due to the refractive index difference between the lens portion 13b and the air in the optical-path changing recess 13 and which forms the bent optical path H.

Hereinbelow, the curved-outer surface 13c of the lens portion 13b refer to a reflection surface or a reflection surface.

The emitted light emitted from the front end of the optical fiber 1 (the front end of the bare optical fiber 1b) propagates through the ferrule main body 11 of the ferrule 10 along the optical path H and outputs from groove bottom at the groove portion 14 of the center portion of the joint surface 18 in the longitudinal direction thereof.

The launched light, which is launched into the optical fiber 1 through the joint surface 18 of the ferrule 10, propagates through the ferrule main body 11 along the optical path H, and is launched into the optical fiber 1 through the front end thereof (the front end of the bare optical fiber 1b).

The reflection surface 13c of each lens portion 13b located on the optical axes of the front end of the bare optical fibers 1b.

Specifically, the optical path H is formed and bent by reflecting the launched light or the emitted light at the front end of the optical fiber 1 by the reflection surface 13c of the lens portion.

The reflection surface 13c of the lens portion serves to reflect the emitted light emitted from the front end of the bare optical fiber 1b, direct the reflected light to the groove portion 14, reflect the launched light which is launched into the ferrule main body 11 from the groove portion 14, and direct the reflected light to the front end of the bare optical fiber 1b.

Additionally, the reflection surface 13c of the lens portion serves to reflect the emitted light emitted from the front end of the optical fiber 1 (the front end of the bare optical fiber 1b) and the light widely-diffused from the optical axis, direct the light to the groove portion 14 as parallel light while preventing optical leakage as much as possible, reflect the launched light which is launched into the ferrule main body 11 from the groove portion 14, direct the reflected light to the front end of the bare optical fiber 1b, and condense the reflected light at the front end of the bare optical fiber 1b.

The optical path H is formed for each of the bare optical fibers 1b and is bent by action of the reflection surface 13c of the lens portion.

Specifically, the optical path H is an optical path of the light which is launched into or emitted from the front-end face of the bare optical fiber 1b (the launched light launched into the bare optical fiber 1b through the front-end face or the emitted light emitted from the front-end face of the bare optical fiber 1b).

In other cases, as an embodiment of a ferrule related to the invention, a structure may be adopted in which formation of the lens portions 13b is omitted and the flatly-formed rear-inclined inner surface 13a serves as a reflection surface forming bent optical paths by reflecting the launched light or the emitted light at the front ends of the optical fibers 1.

As a structure of the ferrule 10, a structure may be preferably adopted in which, a distance from the front end of the bare optical fiber 1b to the reflection surface 13c of the lens portion is determined so that the light, which is launched into the ferrule main body 11 from the groove portion 14 and which is reflected by the reflection surface 13c of the lens portion, condenses at the center portion of the front-end face of the bare optical fiber 1b.

Furthermore, as a structure of the ferrule 10, a structure may be preferably adopted in which, a distance from the reflection surface 13c of the lens portion to the groove portion 14 is determined so that the light, which is emitted from the front end of the bare optical fiber 1b and which is reflected by the reflection surface 13c of the lens portion, reaches the groove portion 14 while being condensed.

As shown in FIG. 4, the optical fiber 1 securely inserted into the ferrule main body 11 (specifically, the bare optical fiber 1b) can be optically spliced to the optical device 31 of the ferrule-receiving unit 30 through the bent optical path H by attaching the ferrule 10 to the ferrule-receiving unit 30.

The ferrule-receiving unit 30 illustrated in FIG. 4 by using an example is provided with a constitution in which a transparent ferrule receiving member 33 is loaded on a top face 32a of a photoelectric conversion module 32 which is packaged into one surface side of a circuit board 35 and which is formed in a plate shape or a block shape in appearance (face on the opposite side of the circuit board 35).

The photoelectric conversion module 32 includes a module body 32b formed in a plate shape or a block shape in appearance and the optical device 31 packaged into the module body 32b.

The top face 32a of the photoelectric conversion module 32 on the opposite side of the circuit board 35 of the module body 32b.

The optical device 31 is housed in an optical-device-containing recess 32c which is hollowed on the center portion of the top face 32a of the module body 32b.

Specifically, the optical-device-containing recess 32c shown as an example is formed in a groove shape extending along the top face 32a of the module body 32b.

The optical devices 31 are provided at a plurality of portions in the longitudinal direction of the groove-shaped optical-device-containing recess 32c (optical-device-containing hollow groove) (in the deep direction of paperface of FIG. 4).

The optical devices 31 are electrically connected to circuit wirings of the circuit board 35 through an electrical circuit provided in the module body 32b.

In addition, the optical device 31 is attached to the module body 32b with the light-receiving face or the light-emitting face facing above the module body 32b (upper direction in FIG. 4, the opening portion side of the optical-device-containing recess 32c.

The optical device 31 functions as a light emission-launch end of the photoelectric conversion module 32.

The ferrule receiving member 33 of the ferrule-receiving unit 30 is provided with a main plate portion 33e extending along the top face 32a of the photoelectric conversion module 32. The surface of the main plate portion 33e, which is on the opposite side of the photoelectric conversion module 32, serves as the ferrule-receiving surface 33a.

A lens formation recess 33b which is hollowed on the center portion of the ferrule-receiving surface 33a is formed at the ferrule receiving member 33.

Moreover, a lens portion 33c which bulges from a bottom surface 33c of the lens formation recess 33b in a hemispherical shape (hereinbelow, refer to receiving-unit lens portion) is formed at the ferrule receiving member 33.

The entire receiving-unit lens portions 33c are positioned in the lens formation recess 33b of the ferrule receiving member 33, and a part of the receiving-unit lens portions 33c does not protrude from the ferrule-receiving surface 33a.

Particularly, the lens formation recess 33b of the ferrule receiving member 33 shown as an example is formed in a groove shape which overlaps the entire optical-device-containing hollow groove 32c of the module body 32b of the photoelectric conversion module 32 in the direction perpendicular to the ferrule-receiving surface 33a.

A plurality of the receiving-unit lens portions 33c are provided at portions in the longitudinal direction of the groove-shaped lens formation recess 33b (lens formation hollow groove) (in the deep direction of paperface of FIG. 4).

As shown in FIG. 4, pin-fitting holes 34a and 34b are formed at the ferrule-receiving unit 30, the locating pins 15a and 15b of the ferrule 10 can be inserted and fitted into the pin-fitting holes 34a and 34b, respectively, and the ferrule 10 is thereby positioned relative to the ferrule-receiving unit 30.

The pin-fitting holes 34a and 34b are formed at two portions different from each other so as to correspond to two locating pins 15a and 15b of the ferrule 10 in a direction along the ferrule-receiving surface 33a of the main plate portion 33e of the ferrule receiving member 33.

The pin-fitting holes 34a and 34b of the ferrule-receiving unit 30 located at two portions are formed so as to open at the both sides of the lens formation hollow groove 33b interposed therebetween.

The pin-fitting holes 34a and 34b are formed and capable of accommodating the entire portions of the locating pins 15a and 15b of the ferrule 10 which protrude from the joint surface 18 of the ferrule main body.

In FIG. 4, the pin-fitting holes 34a and 34b are only formed at the main plate portion 33e of the ferrule receiving member 33 and are not formed on the photoelectric conversion module 32.

The locating pins 15a and 15b are inserted and fitted into the pin-fitting holes 34a and 34b of the ferrule-receiving unit 30 located at two portions, the ferrule-receiving surface 33a of the ferrule-receiving unit 30 is connected together with the joint surface 18, and the ferrule 10 is thereby attached to the ferrule-receiving unit 30.

As a result of the locating pins 15a and 15b being inserted and fitted into the pin-fitting holes 34a and 34b of the ferrule-receiving unit 30, the ferrule 10 is positioned relative to the optical device 31 of the photoelectric conversion module 32 with a high level of precision, and the groove bottom surface 14a of the groove portion 14 is thereby disposed so as to face to the optical device 31.

The ferrule receiving member 33 of the ferrule-receiving unit 30 shown in FIG. 4 as an example includes a ferrule-contact wall portion 33d protruding from the ferrule-receiving surface 33a of the main plate portion 33e.

Since the ferrule-contact wall portion 33d is made in contact with the side face of the outer-circumference in the direction parallel to the surface of the plate-shaped ferrule main body 11 of the ferrule 10 (the front-edge face 11c on the opposite side of the rear-edge face 11a of the ferrule main body 11 in the example shown in the drawing), substantial positioning in the direction along the ferrule-receiving surface 33a relative to the ferrule-receiving unit 30 of the ferrule main body 11 of the ferrule 10 is realized.

The ferrule-contact wall portion 33d comes into contact with the side face of the outer-circumference in the direction parallel to the surface of the plate-shaped ferrule main body 11 of the ferrule 10, the ferrule main body 11 is substantially positioned relative to the ferrule-receiving unit 30. As a result, the locating pins 15a and 15b of the ferrule 10 can be substantially positioned relative to the pin-fitting holes 34a and 34b of the ferrule-receiving unit 30.

A vertical surface 33f perpendicular to the ferrule-receiving surface 33a is formed at the ferrule-contact wall portion 33d of the ferrule-receiving unit 30 shown in FIG. 4 as an example.

The vertical surface 33f of the ferrule-contact wall portion 33d are formed so as to face a region of the ferrule-contact wall portion 33d on the ferrule-receiving surface 33a on which the ferrule 10 is disposed in a state where the locating pins 15a and 15b are fitted into the pin-fitting holes 34a and 34b of the ferrule-receiving unit 30.

When the ferrule 10 is attached to the ferrule-receiving unit 30, due to making the side face of the outer-circumference in the direction parallel to the surface of the ferrule main body 11 come into contact with the vertical surface 33f of the ferrule-contact wall portion 33d, the locating pins 15a and 15b can be substantially positioned relative to the pin-fitting holes 34a and 34b of the ferrule-receiving unit 30, and insertion and fitting of the locating pins 15a and 15b with respect to the pin-fitting holes 34a and 34b of the ferrule-receiving unit 30 are smoothly carried out.

By, for example, sliding the ferrule 10 toward the ferrule-receiving surface 33a along the vertical surface 33f in the direction perpendicular to the ferrule-receiving surface 33a in a state where the side face of the outer-circumference in the direction parallel to the surface of the ferrule main body 11 is in contact with the vertical surface 33f of the ferrule-contact wall portion 33d, insertion and fitting of the locating pins 15a and 15b with respect to the pin-fitting holes 34a and 34b of the ferrule-receiving unit 30 are smoothly carried out.

The ferrule receiving member 33 shown in FIG. 4 as an example is configured to include the tabular main plate portion 33e forming the ferrule-receiving surface 33a and the ferrule-contact wall portion 33d protruding from the main plate portion 33e.

Additionally, the entire ferrule receiving member 33 shown in FIG. 4 as an example is made of, for example, transparent plastic such as acrylic plastic or the like, or a transparent element such as glass.

However, regarding a structure of the ferrule receiving member 33, at least a portion overlapping the lens portion 33c in the thickness directions of the lens portion 33c and the main plate portion 33e has only to be transparent, the other portion may be formed to be obscure.

Furthermore, the ferrule-contact wall portion 33d of the ferrule receiving member 33 is not limited to be in contact with the front-edge face 11c of the ferrule main body 11, the ferrule receiving member 33 may be in contact with one of the side faces (sidewall faces) formed at the both sides of the ferrule main body 11 in the width direction thereof.

Moreover, as a constitution of the ferrule receiving member 33, a constitution may be adopted which includes: a ferrule-contact wall portion with which the front-edge face 11c of the ferrule main body 11 is in contact; and a ferrule-contact wall portion with which one of the sidewall faces of the ferrule main body 11 in the width direction thereof is in contact.

A plurality of the optical devices 31 of the ferrule-receiving unit 30 are provided and arrayed on the photoelectric conversion module 32 so that the front end of the bare optical fiber 1b of the optical fiber 1 securely inserted into the ferrule 10 can be optically spliced to the optical path H corresponding to each bare optical fiber 1b when the locating pins 15a and 15b are inserted and fitted into the pin-fitting holes 34a and 34b of the ferrule-receiving unit 30 and the ferrule 10 is thereby attached to the ferrule-receiving unit 30.

A plurality of the optical device 31 are provided at portions in the longitudinal direction of the optical-device-containing hollow groove 32c of the photoelectric conversion module 32.

In addition, in order to interpose the optical path H for each bare optical fiber 1b, a plurality of the receiving-unit lens portions 33c of the ferrule-receiving unit 30 are provided so as to correspond to the optical devices 31 of the photoelectric conversion module 32 in the longitudinal direction of the lens formation hollow groove 33b.

In FIG. 4, when the optical devices 31 are a light receiving element such as a photodiode or the like, the ferrule 10 can guide (optically splice) the emitted light emitted from the front ends of the optical fibers 1 (the front ends of the bare optical fibers 1b) through the optical path H to the light receiving elements.

In this case, the emitted light emitted from the front end of the optical fiber 1 is reflected by the reflection surface 13c of the lens portion, passes through the groove bottom surface 14a of the groove portion 14, is emitted from the groove bottom surface 14a toward the light receiving element, and is received by the light receiving element.

The lens portions 33c of the ferrule-receiving unit 30 shown in FIG. 4 as an example are arrayed at positions covering the light-receiving face or the light-emitting face of the optical device 31.

In FIG. 4, the light, which is reflected by the reflection surface 13c of the lens portion of the ferrule 10 and emitted from the groove bottom surface 14a of the groove portion 14 toward the light receiving element, passes through the receiving-unit lens portion 33c, and is received by the light receiving element (the optical device 31).

The reflection surface 13c of the lens portion of the ferrule 10 reflects the emitted light emitted from the front end of the optical fiber 1 (the front end of the bare optical fiber 1b) and converts the reflected light into parallel light traveling (propagating) toward the groove bottom surface 14a of the groove portion 14 in the ferrule main body 11.

The light, which is emitted from the front end of the optical fiber 1 (the front end of the bare optical fiber 1b) and reflected by the reflection surface 13c of the lens portion of the ferrule 10 while maintaining the parallel light state, is emitted from the groove bottom surface 14a of the groove portion 14 toward the light receiving element of the ferrule-receiving unit 30, and enters the receiving-unit lens portion 33c.

The reflection surfaces 13c of the lens portions of the ferrule 10 serves to reflect the emitted light emitted from the front ends of the optical fibers 1 (the front ends of the bare optical fibers 1b) and the light widely-diffused from the optical axis while preventing optical leakage as much as possible, and direct the reflected light to the light receiving elements of the ferrule-receiving unit 30 while preventing optical leakage as much as possible.

The receiving-unit lens portion 33c serves to condense and combine the parallel light emitted from the reflection surface 13c of the lens portion of the ferrule 10 into the light receiving element (specifically, the light-receiving face).

In FIG. 4, in the case where the optical device 31 of the ferrule-receiving unit 30 is a light-emitting element such as a laser diode or the like, the ferrule 10 can launch the emitted light emitted from the light-emitting element to the front end of the optical fiber 1 (the front end of the bare optical fiber 1b) through the optical path H.

The emitted light emitted from the optical device 31 of the ferrule-receiving unit 30 is incident to the ferrule main body 11 of the ferrule 10 through the groove bottom surface 14a, reaches the reflection surface 13c of the lens portion, is reflected by the reflection surface 13c of the lens portion, and is launched into the optical fiber 1 (the bare optical fiber 1b) through the front end.

The lens portion 33c of the ferrule-receiving unit 30 serves to converts the emitted light traveling toward the reflection surface 13c of the lens portion from the light-emitting element through the groove bottom surface 14a of the ferrule 10, into parallel light.

As the light-emitting element, for example, a surface emission type laser diode (e.g., VCSEL: Vertical Cavity Surface Emitting LASER) can be preferably used.

In FIG. 4, when a surface emission type laser diode is used as a light-emitting element, the emitted light emitted from the surface emission type laser diode passes through the receiving-unit lens portion 33c, is incident to the ferrule main body 11 of the ferrule 10 through the groove bottom surface 14a, and reaches the reflection surface 13c of the lens portion.

Subsequently, the light emitted from the surface emission type laser diode and reaching the reflection surface 13c of the lens portion is reflected by the reflection surface 13c of the lens portion and directed to the front end of the optical fiber 1 (the bare optical fiber 1b), and launched into the front end of the optical fiber 1 (the bare optical fiber 1b).

The reflection surface 13c of the lens portion serves to condense the incident light emitted from the groove bottom surface 14a (here, the emitted light emitted from the surface emission type laser diode), direct the condensed light to the front end of the optical fiber 1 (the bare optical fibers 1b), and launch the directed light into the front end of the optical fiber 1 (the bare optical fiber 1b).

The reflection surface 13c of the lens portion serves to reflect the incident light which is incident to the ferrule main body 11 from the groove bottom surface 14a and is directed to the reflection surface 13c of the lens portion and the light which is separated (diffused) from the optical axis and is directed to the reflection surface 13c of the lens portion from the groove portion 14 while preventing optical leakage as much as possible, direct the light to the front end of the optical fiber 1 (the bare optical fiber 1b), and launch the directed light thereinto.

The groove bottom surface 14a of the ferrule main body 11 can be functioned as a light output port (light emission-launch portion) emitting the light, which is emitted from the front end of the optical fiber 1 (the bare optical fiber 1b) and reflected by the reflection surface 13c of the lens portion, from the ferrule main body 11.

In addition, the groove bottom surface 14a of the ferrule main body 11 can be functioned as light input port (light emission-launch portion) leading the emitted light emitted from the light emission-launch end (e.g., light-emitting element as described above) of the ferrule-receiving unit 30, to which the ferrule 10 is attached, to be incident to the ferrule main body 11.

Figure 3C:
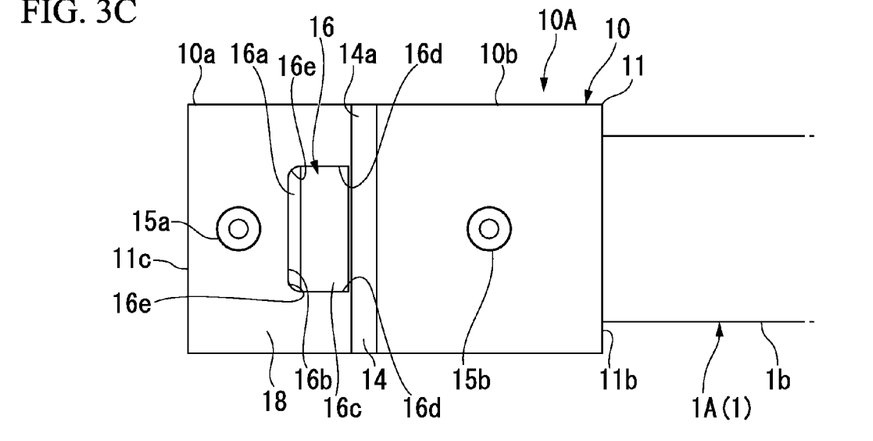
FIG. 3C is a view showing the exterior structure of the ferrule and the optical-fiber-attached ferrule of FIG. 1 and is a bottom view showing a structure as seen from the connection-surface-side (joint surface side) thereof.

As shown in FIGS. 3B, 3C, and 4, the shaping-adjustment recess 16 is formed between the locating pins 15a and 15b which are placed at two portions separated from each other in the front-back direction of the joint surface 18 and is hollowed on the joint surface 18.

Figure 5:
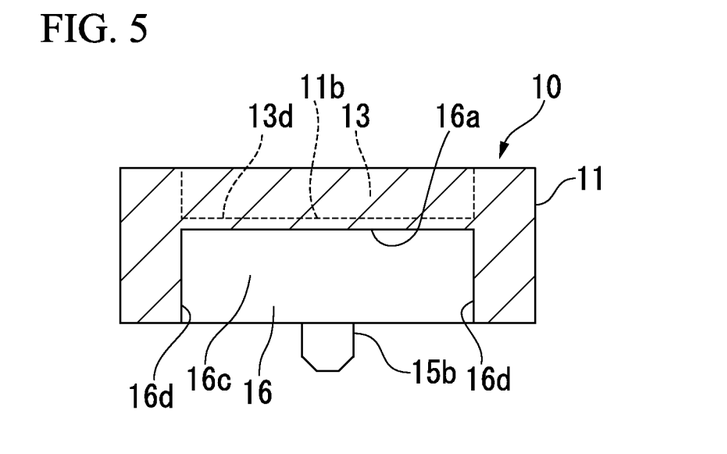
FIG. 5 is a cross-sectional view taken along the line A-A of FIG. 4 and is a view showing a structure of a shaping-adjustment recess of the ferrule of FIG. 4.

As shown in FIGS. 3B, 3C, and 5, in the ferrule 10 shown as an example, the shaping-adjustment recess 16 is specifically formed between the groove portion 14 and the locating pin 15*a* located at the front side of the ferrule main body, hollowed on the joint surface 18, and extends in the width direction of the ferrule main body 11.

As shown in FIGS. 2, 3C, and 4, the shaping-adjustment recess 16 shown as an example has a recess bottom surface 16*a* formed along a back face 12 of the ferrule main body.

As shown in FIGS. 3B, 3C, and 5, the recess bottom surface 16*a* is a groove bottom surface of the groove-shaped shaping-adjustment recess 16 and is an elongated surface extending in the width direction of the ferrule main body 11 as a longitudinal direction.

Furthermore, the shaping-adjustment recess 16 has a recess-front inner surface 16*b* (recess-front-vertical inner surface, hereinbelow, refer to recess-front-vertical inner surface) formed so as to extend from the front edge of the recess bottom surface 16*a* in a direction perpendicular to the front-back direction of the ferrule main body, and a recess-rear inner surface 16*c* (recess-rear-inclined inner surface) formed obliquely to the joint surface 18 so as to gradually approximate the joint surface 18 while approaching the back side of the ferrule main body 11 from the rear edge of the recess bottom surface 16*a*.

As shown in FIG. 4 and the like, the recess-rear inner surface 16*c* of the shaping-adjustment recess 16 is formed along the front-inner surface 13*e* (parallel with the front-inner surface 13*e* in FIG. 4 and the like) at the position which is displaced from the front-inner surface 13*e* (front-side oblique inner surface) of the optical-path changing recess 13 to the joint surface 18.

The recess bottom surface 16*a* of the shaping-adjustment recess 16 is located at the position which is displaced so as to be closer to the front side of the ferrule main body than the bottom surface 13*d* of the optical-path changing recess 13.

In the ferrule 10 shown as an example, the shaping-adjustment recess 16 is separated from the optical-path changing recess 13 via an inter-recess wall portion 11*b* which is ensured between the recess-rear inner surface 16*c* and the front-inner surface 13*e* of the optical-path changing recess 13.

The shaping-adjustment recess 16 is not communicated with the optical-path changing recess 13.

According to the constitution in which the inter-recess wall portion 11*b* is ensured between the recess-rear inner surface 16*c* of the shaping-adjustment recess 16 (recess-rear-inclined inner surface) and the front-inner surface 13*e* of the optical-path changing recess 13 (front-side oblique inner surface), when the ferrule 10 having the shaping-adjustment recess 16 and the optical-path changing recess 13 is resin-molded, the space used for forming the inter-recess wall portion 11*b* ensured in a die and the intermediate portion between the shaping-adjustment recess 16 and the optical-path changing recess 13 can be functioned as a flow passage of a molding resin.

In the resin-molding of the ferrule 10 having the shaping-adjustment recess 16 and the optical-path changing recess 13, the die having the shaping-adjustment recess-formation protrusion and a protruding portion for forming the optical-path changing recess therein is used.

In the resin-molding of the ferrule 10 in which the inter-recess wall portion 11*b* is ensured between the rear-inclined inner surface 16*c* (hereinbelow, refer to recess-rear-inclined inner surface) of the shaping-adjustment recess 16 and the front-side oblique inner surface 13*e* of the optical-path changing recess 13, the space used for forming the inter-recess wall portion 11*b* ensured between the shaping-adjustment recess-formation protrusion and the protruding portion for forming the optical-path changing recess which are formed inside the die can be functioned as a flow passage of a molding resin.

In the shaping-adjustment recess 16, the portion which is located between the pair of the locating pins 15*a* and 15*b* in the front-back direction of the ferrule main body 11, in other words, the area between the portion close to the groove portion 14 and the center portion positioned between the groove portion 14 and the front-side locating pin 15*a* (hereinbelow, refer to front pin) in the drawings as an example, is reduced in thickness.

In other cases, in the ferrule 10 shown as an example, the shaping-adjustment recess 16 is formed at one portion and is not formed behind the groove portion 14.

Commonly, a molding resin contracts in accordance with solidification in a resin-mold process.

The shaping of a plate-shaped ferrule (ferrule main body) has a tendency to generate contraction around the center portion of a thick portion due to solidifying a molding resin.

Figure 7:
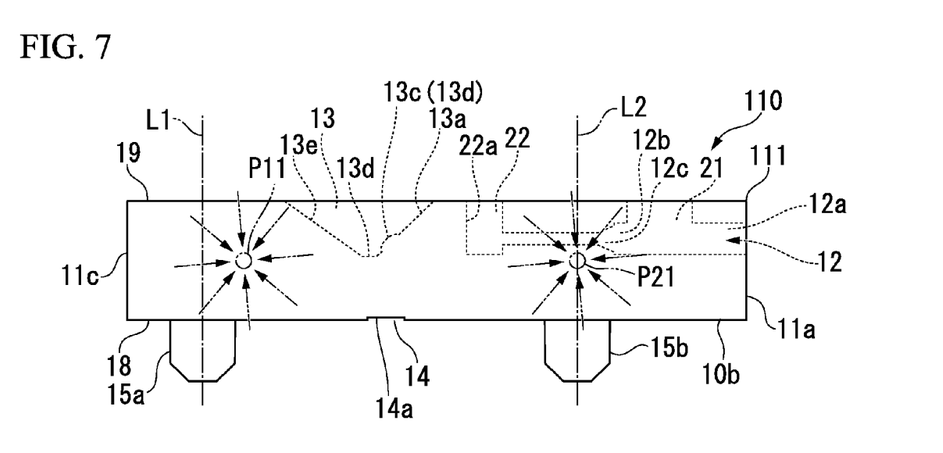
FIG. 7 is a model diagram schematically illustrating the location of the contraction center which is caused by solidifying a molding resin in the process of resin-molding an absent-adjustment-recess ferrule which is the ferrule shown in FIG. 1 from which a shaping-adjustment recess is omitted (comparative example of a ferrule).

FIG. 7 shows a ferrule 110 (hereinbelow, refer to absent-adjustment-recess ferrule) having a structure in which the shaping-adjustment recess 16 is omitted from the ferrule 10 shown in FIG. 6.

A ferrule main body 111 of the ferrule 110 is different from the ferrule main body 11 of the ferrule 10 in that the shaping-adjustment recess 16 is only omitted.

In FIG. 7, identical symbols are used for the elements which are identical to the ferrule 10, and the explanations thereof are omitted or simplified.

In the absent-adjustment-recess ferrule 110, the formation portion of the optical-path changing recess 13 located at the center portion in the front-back direction (the front-back direction of the ferrule main body or left-right direction of FIG. 7) is reduced in thickness so as to be thinner than that of the portion located forward the optical-path changing recess 13 and the portion located backward the optical-path changing recess 13.

In other words, the portion located forward the optical-path changing recess 13 and the portion located backward the optical-path changing recess 13 in the ferrule main body 111 of the absent-adjustment-recess ferrule 110 are thicker than that of the formation portion of the optical-path changing recess 13 located at the center portion of the ferrule main body 111 in the front-back direction thereof.

In the resin-mold process for molding the absent-adjustment-recess ferrule 110, the shrinkage phenomenon which is caused by solidifying a molding resin has a tendency to generate with a central focus on two portions which are the center portion of the forward portion of the bottom surface 13*d* of the optical-path changing recess 13 of the ferrule main body 111 (left side of FIG. 7) and the center portion of the backward portion of the bottom surface 13*d* of the optical-path changing recess 13 (right side of FIG. 7).

The front pin 15*a* and the rear-side locating pin 15*b* (hereinbelow, refer to rear pin 15*b*) of the ferrules 10 and 110 shown in FIGS. 6 and 7 are pin-shaped protuberances formed so as to protrude from the joint surface 18 of the ferrule main body along the central axis lines L1 and L2 perpendicular to the joint surface 18 of the ferrule main body.

The central axis line L1 of the front pin 15*a* is located at the position which is displaced so as to be closer to the front side of the ferrule main body than the center portion of the forward portion of the bottom surface 13*d* of the optical-path changing recess 13 of the ferrule main bodies 11 and 111 (hereinbelow, refer to forward portion of the ferrule main body).

More specifically, the central axis line L1 of the front pin 15*a* is located at the position which is displaced from the front edges of the ferrule main bodies 11 and 111 to the back side of the ferrule main body by a distance that is substantially quarter the distance between the bottom surface 13*d* of the optical-path changing recess and the front edges of the ferrule main bodies 11 and 111.

On the other hand, the position of the central axis line L2 of the rear pin 15*b* in the direction along the joint surface 18 of the ferrule main body coincides with the center portion of the backward portion of the bottom surface 13*d* of the optical-path changing recess 13 of the ferrule main bodies 11 and 111 (hereinbelow, refer to backward portion of the ferrule main body).

Particularly, the center portion of the forward portion of the ferrule main body means the center between the bottom surface 13*d* of the optical-path changing recess 13 and the front edges of the ferrule main bodies 11 and 111 in the front-back direction of the ferrule main body, and the position close to the center point (the center point and the vicinity of thereof) in the width direction of the ferrule main body and the thickness direction of the ferrule main body (direction perpendicular to the joint surface 18).

The center portion of the backward portion of the ferrule main body means the center between the bottom surface 13*d* of the optical-path changing recess 13 and the rear edges of the ferrule main bodies 11 and 111 in the front-back direction of the ferrule main body, and the position close to the center point (the center point and the vicinity of thereof) in the width direction of the ferrule main body and the thickness direction of the ferrule main body (direction perpendicular to the joint surface 18).

The inventors studied the resin-mold process for molding the absent-adjustment-recess ferrule 110, as a result of study in, the inventors discovered that the shrinkage phenomenon with a central focus on the center portion of the forward portion of the ferrule main body causes the inclination of the front pin 15*a*, that is, the inclination of the central axis line L1 of the front pin 15*a* with respect to the virtual perpendicular line (hereinbelow, refer to vertical reference line) perpendicular to the center portion of the joint surface 18 of the ferrule main body 111 (but, excluding the groove portion 14).

As shown in FIG. 7, when the contractile phenomenon occurs with a central focus on the center portion of the forward portion of the ferrule main body (e.g., the contraction center P11 shown in FIG. 7 as an example) due to solidifying a molding resin in the resin-mold process for molding the absent-adjustment-recess ferrule 110, the front pin 15*a* may be inclined.

Additionally, in the absent-adjustment-recess ferrule 110 shown as an example, the position of the central axis line L2 of the rear pin 15*b* in the direction along the joint surface 18 of the ferrule main body coincides with the center portion of the backward portion of the ferrule main body 111 as described above.

Consequently, even where the shrinkage phenomenon with a central focus on the center portion of the backward portion of the ferrule main body 111 (for example, the contractile phenomenon generated with a central focus on the contraction center P21 shown in FIG. 7) in the absent-adjustment-recess ferrule 110, the effect on the direction of the rear pin 15*b* (specifically, the central axis line L2) due to this shrinkage phenomenon can substantially be ignored or there is no effect due to the phenomenon.

Particularly, the contraction center P11 shown in FIG. 7 is located slightly closer to the front edge of the ferrule main body 111 than the center position between the bottom surface 13*d* of the optical-path changing recess 13 and the front edge of the ferrule main body 111 in the front-back direction of the ferrule main body 111.

The distance from the center position between the bottom surface 13*d* of the optical-path changing recess 13 and the front edge of the ferrule main body 111 to the contraction center P11 is dramatically shorter than the distance from the central axis line L1 of the front pin 15*a* to the contraction center P11.

As shown in FIG. 6, the ferrule 10 of the embodiment related to the invention is configured so that the thickness of the area from the center portion between the groove portion 14 and the front pin 15*a* in the ferrule main body 11 to near the groove portion 14 is reduced by forming the shaping-adjustment recess 16.

In the ferrule 10, the ferrule main body 11 having the shaping-adjustment recess 16 is employed. By use of the shaping-adjustment recess 16, the position of the contraction center (first contraction center P1), which is caused by solidifying a molding resin of the forward portion of the ferrule main body located forward the bottom surface 13*d* of the optical-path changing recess 13 in the resin-mold process, is located on the central axis line L1 of the front pin 15*a*.

The shrinkage phenomenon, which is caused by solidifying a molding resin in the resin-mold process of the ferrule 10, has a tendency to generate with a central focus on two portions which are the center portion of the front-side portion of the shaping-adjustment recess 16 in the ferrule main body 11 (hereinbelow, refer to front-body portion 10*a*) and the center portion of the backward portion 10*b* located backward the shaping-adjustment recess 16.

The center portion of front-body portion 10*a* means the center between the front edge of the shaping-adjustment recess 16 (the recess-front-vertical inner surface 16*b* in the example shown in the drawing) and the front edge of the ferrule main body 11 in front-back direction of the ferrule main body 11, and the position close to the center point (the center point and the vicinity of thereof) in the width direction of the ferrule main body and the thickness direction of the ferrule main body (direction perpendicular to the joint surface 18).

The center point of front-body portion 10*a* is located on the central axis line L1 of the front pin 15*a*.

As shown in FIG. 6, the first contraction center P1 close to the front-body portion 10*a* is located on the central axis line L1 of the front pin 15*a* by the shaping-adjustment recess 16.

The contraction center P1 close to the front-body portion 10*a* shown in FIG. 6 as an example is located at the center point of front-body portion 10*a*.

For this reason, even where the shrinkage phenomenon which is caused by solidifying a molding resin in the resin-mold process of the ferrule 10 occurs, the effect on the direction of the front pin 15*a* (specifically, the central axis line L1) due to this shrinkage phenomenon can substantially be ignored or there is no effect due to the phenomenon.

In FIG. 6, the contraction center P2 (hereinbelow, refer to second contraction center) located backward the optical-path changing recess 13 and the shaping-adjustment recess 16 is located on the central axis line L2 of the rear pin 15*b*.

The distance from the shaping-adjustment recess 16 to the rear pin 15*b* in front-back direction of the ferrule main body 11 is dramatically longer than the distance from the shaping-adjustment recess 16 to the front pin 15*a*.

Because of this, the forming of the shaping-adjustment recess 16 in the ferrule main body 11 does not substantially affect the location of the contraction center close to the backward portion 10b of the ferrule 10.

As a result, the contractile phenomenon which is caused by solidifying a molding resin has a tendency to generate with the near center point of the backward portion 10b at the backward portion 10b of the ferrule 10 as the same as the ferrule 110 shown in FIG. 7.

The shrinkage phenomenon, which is generated at the backward portion 10b and which is caused by solidifying a molding resin in the resin-mold process of the ferrule 10, occurs with a central focus on the same position as the contraction center P21 shown in FIG. 7 such as the contraction center P2 shown in FIG. 6, that is, on the second contraction center P2 located on the central axis line L2 of the rear pin 15b.

In the ferrule 10 of the embodiment related to the invention, both the contraction centers P1 and P2, which are caused by solidifying a molding resin in the resin-mold process and which are located at the both sides in the back and forth of the ferrule main body 11, are located on the central axis lines of the locating pins 15a and 15b.

Therefore, due to the resin-molding of the ferrule 10, it is possible to form the pair of the locating pins 15a and 15b with a high level of precision so that the central axis lines are parallel to each other in predetermined directions relative to the ferrule main body 11.

Regarding the shaping-adjustment recess 16 of the ferrule 10, the inventors intensively researched and finally discovered that it is effective to dispose the contraction center P1 close to the front-body portion 10a on the central axis line L1 of the front pin 15a by satisfying the conditions as follows: the distance A from the central axis line L1 of the front pin to the front edge of the ferrule main body 11 and the distance B from the central axis line L1 of the front pin to the shaping-adjustment recess 16 satisfy A/B=0.7 to 1.3 as shown in FIG. 6; and the thickness T of the portion in which the shaping-adjustment recess 16 of the ferrule main body 11 is to be formed (the distance between the joint surface 18 and the back face 19, hereinbelow, refer to ferrule height) and the formation depth C from the joint surface 18 of the shaping-adjustment recess 16 satisfy C≥0.4×T.

The shaping-adjustment recess 16 is not limited to the constitution shown as an example.

The recess-front inner surface 16b is not limited to the surface perpendicular to the front-back direction of the ferrule main body (recess-front-vertical inner surface) shown in FIG. 4 or the like, a sloped surface (recess-front-oblique inner surface) gradually approximates the joint surface 18 while approaching the front side of the ferrule main body 11 may be used as the recess-front inner surface 16b.

The recess-rear inner surface 16c is not limited to the surface (recess-rear-inclined inner surface) oblique to the joint surface 18 so as to gradually approximate the joint surface 18 while approaching the back side of the ferrule main body 11, a surface (recess-rear-vertical inner surface) perpendicular to the front-back direction of the ferrule main body may be used as the recess-rear inner surface 16c.

Additionally, as a structure of the shaping-adjustment recess, a structure in which the recess bottom surface 16a is not formed and the recess-rear-vertical inner surface or the recess-rear-inclined inner surface is formed so as to extend from the rear edge of the recess-front-oblique inner surface, or a structure in which the recess-front-vertical inner surface is formed so as to extend from the front edge of the recess-rear-inclined inner surface, may be adopted.

However, it is preferable that the shaping-adjustment recess 16 have at least one of the recess-front-oblique inner surface and the recess-rear-inclined inner surface in order to, for example, make the resin smooth when the ferrule 10 is molded.

Moreover, in terms of making the resin smooth when the ferrule 10 is molded, the structure having the recess bottom surface 16 is advantageous more than the structure in which the recess bottom surface 16a does not exist.

Figure 8A:
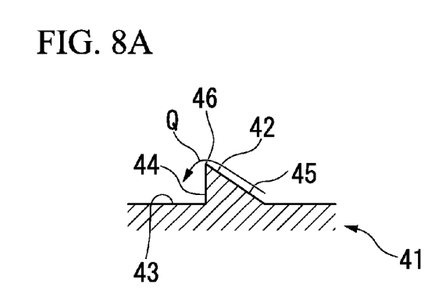
FIG. 8A is a view showing an example of a recess-formation protrusion which is in a die used for the process of resin-molding a ferrule of the embodiment related to the invention and which is used for forming the shaping-adjustment recess.

FIG. 8A is a diagram illustrating an example of resin-molding near the shaping-adjustment recess of the ferrule.

In FIG. 8A, a protrusion portion 42 of a die 41 (hereinbelow, the recess-formation protrusion), which is used for forming the shaping-adjustment recess, protrudes from a joint-surface-shaping surface 43 (a part of a die inner surface) which is used for forming the joint surface of the ferrule.

The recess-formation protrusion 42 is formed in a rectangular triangle shape having a perpendicular face 44 perpendicular to the joint-surface-shaping surface 43 and an inclined face 45 oblique to the perpendicular face 44 in the cross section.

The recess-formation protrusion 42 forms the shaping-adjustment recess in which the recess bottom surface 16a is omitted from the shaping-adjustment recess 16 shown in FIG. 4 as an example and the recess-rear-vertical inner surface is formed so as to extend from the rear edge of the recess-front-oblique inner surface.

In FIG. 8A, the flow Q of the molding resin toward the front side from the back side of the recess-formation protrusion 42 inside the die (right side from the recess-formation protrusion 42) has a tendency to generate a vortex flow at the downstream side in the flow direction from a sharp-tapered protruding end portion 46 of the recess-formation protrusion 42.

Figure 8B:
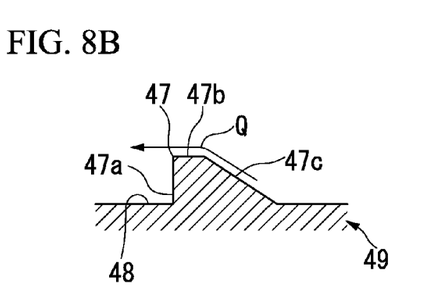
FIG. 8B is a view showing an example of a recess-formation protrusion which is in a die used for the process of resin-molding a ferrule of the embodiment related to the invention and which is used for forming the shaping-adjustment recess.

In contrast, as shown in FIG. 8B, the recess-formation protrusion 47 serving as a die protrusion portion forming the shaping-adjustment recess 16 shown in FIG. 4 as an example protrudes from the joint-surface-shaping surface 48 of the die (a part of the die inner surface).

The recess-formation protrusion 47 includes a perpendicular face 47a forming the recess-front-vertical inner surface 16b of the shaping-adjustment recess 16, a protruding edge face 47b forming the recess bottom surface 16a, and an inclined face 47c forming the recess-rear-inclined inner surface 16c.

The flow Q of the molding resin flowing from the back side of the recess-formation protrusion 47 (from the recess-formation protrusion 47 to the right side) to the front side in the die becomes a laminar flow smoothly flowing along the protruding edge face 47b extending in the direction along the joint-surface-shaping surface 48 of the die (parallel in the example shown in FIG. 8B).

This configuration is advantageous to apply the resin from the recess-formation protrusion 47 throughout the entirety of the inside space of the die which is located at the front side.

In other cases, the recess-formation protrusion (protrusion portion for forming the shaping-adjustment recess) is not limited to the constitution shown as an example.

As the recess-formation protrusion, the constitution may be adopted in which the inclined face (second inclined face) having the inclination angle with respect to the joint-surface-shaping surface 48 smaller than that of the inclined face 47c is formed between the protruding edge face 47b of the recess-formation protrusion 47 shown in FIG. 8B and the inclined face 47c.

As illustrated with reference to FIG. 4, the recess-rear inner surface 16c of the shaping-adjustment recess 16 (recess-rear-inclined inner surface) is formed at the position which is displaced from the front-inner surface 13e of the optical-path changing recess 13 (front-side oblique inner surface) to the joint surface 18, and is formed along the front-inner surface 13e substantially parallel (parallel with the front-inner surface 13e in FIG. 4 or the like).

According to this configuration, when resin-molding the ferrule 10, the space ensured between the recess-formation protrusion used for forming the shaping-adjustment recess 16 of the die and the die protrusion portion used for forming the optical-path changing recess 13 can be functioned as a flow passage of a molding resin.

In the constitution in which the recess-rear inner surface 16c of the shaping-adjustment recess 16 is formed along the front-inner surface 13e of the optical-path changing recess 13 substantially parallel, the molding resin smoothly flows in the space ensured between the recess-formation protrusion used for forming the shaping-adjustment recess 16 of the die and the die protrusion portion used for forming the optical-path changing recess 13, and the molding resin is less easily accumulated in the space.

This configuration is also advantageous to smoothly supply the molding resin to the entirety of the inside of the die.

As shown in FIG. 3C, the ferrule 10 has inside surfaces 16d which are formed perpendicular to the width direction of the ferrule main body at the both sides in the width direction of the ferrule main body of the shaping-adjustment recess 16, that is, at the both sides in the extending direction of the groove-shaped shaping-adjustment recess 16 (resin-contraction adjustment groove).

Additionally, the shaping-adjustment recess 16 shown as an example has curved inner surfaces 16e formed between the inside surfaces 16d located at the both sides thereof and the recess-front inner surface 16c.

In the shaping-adjustment recess 16 shown as an example, the entire portions between the inside surfaces 16d located at the both sides thereof and the recess-front inner surface 16c are the curved inner surfaces 16e.

The curved inner surfaces 16e are formed at internal corner portions between the inside surfaces 16d located at the both sides thereof and the recess-front inner surface 16c of the ferrule main body 11.

The curved inner surface 16e is formed so as to gradually approximate the center portion in the width direction of the ferrule main body (the center portion in the width direction of the ferrule main body of the groove-shaped shaping-adjustment recess 16 shown as an example) while approaching the front side of the ferrule main body 11 from the front edge of the inside surface 16d of the both sides of the shaping-adjustment recess 16.

The structure, in which the curved inner surfaces 16e are formed between the inside surfaces 16d located at the both sides thereof and the recess-front inner surface 16c of the shaping-adjustment recess 16, serves to smoothly apply the flow of the molding resin from the back side of the shaping-adjustment recess 16 to the front side in the resin-mold process of the ferrule 10.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

Figure 9:
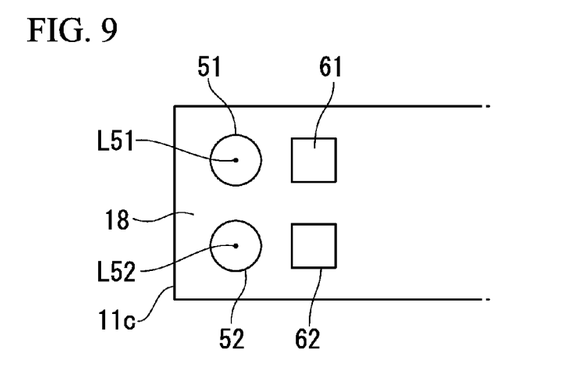
FIG. 9 is a view showing a ferrule of a different aspect of the embodiment related to the invention and is a bottom view showing the vicinity of a front-edge portion of the connection-surface-side (joint surface side).

As an embodiment of a ferrule related to the invention, a constitution can be adopted in which the locating pins 51 and 52 protruding from the joint surface 18 are formed at two portions which are, for example, separated from each other along the side face of the ferrule main body 11 (the front-edge face 11c shown as an example) as shown in FIG. 9.

Furthermore, the ferrule shown in FIG. 9 as an example is configured to form shaping-adjustment recesses 61 and 62 on the opposite side of the ferrule main body 11 side face (the front-edge face 11c) such that the locating pins 51 and 52 of the ferrule main body 11 are sandwiched therebetween.

Particularly, as an embodiment of a ferrule related to the invention, a structure may be adopted in which a plurality of the shaping-adjustment recesses 61 and 62 are formed at the ferrule main body 11 so as to correspond to the locating pins 51 and 52 located at two portions, respectively such as the ferrule shown in FIG. 9 as an example.

Additionally, in the shaping-adjustment recesses 61 and 62 shown in FIG. 9, the distance A from the central axis lines L51 and L52 of the locating pins 51 and 52 to the front edge of the ferrule main body 11 and the distance B from the central axis lines L51 and L52 of the locating pins to the shaping-adjustment recesses 61 and 62 satisfy A/B=0.7 to 1.3, and furthermore the ferrule height T of the formation portions of the shaping-adjustment recesses 61 and 62 in the ferrule main body 11 and the formation depth C from the joint surface 18 of the shaping-adjustment recesses 61 and 62 satisfy C≥0.4× T. According to these satisfactions, it is effective to dispose the contraction center, which is caused by solidifying a molding resin in the process of resin-molding a ferrule, on the central axis lines L51 and L52 of the locating pins.

The light emission-launch end of the ferrule-receiving unit is not limited to an optical device.

As the light emission-launch end, for example, an optical fiber may be used.

Furthermore, as the light emission-launch end used for emission of light (optical output), a light-emitting diode, other light sources, or the like may be used.

What is claimed is:

1. A ferrule comprising:
   a ferrule main body having a front edge, a rear edge, a top surface and a lower surface;
   a fiber insertion hole, extending into the ferrule main body from the rear edge of the ferrule main body;
   a first recess provided in the top surface of the ferrule main body, the first recess comprising a reflection surface which is a rear surface of the first recess, wherein the reflection surface reflects light on an optical path between the fiber insertion hole and a light emission-launch portion;
   the light emission-launch portion provided in the lower surface of the ferrule main body;
   a locating pin extending outward from the lower surface of the ferrule main body and disposed between the light emission launch portion and the front edge of the ferrule main body; and
   a second recess provided in the lower surface of the ferrule main body and disposed between the light emission-launch portion and the locating pin,
   wherein A is a distance from an axis line of the locating pin to the front edge of the ferrule main body, B is a distance from the axis line of the locating pin to a front surface of the second recess, and $0.7 \leq A/B \leq 1.3$; and
   T is a height of the ferrule from the top surface of the ferrule main body to the lower surface of the ferrule main body, C is a depth of the second recess from the lower surface of the ferrule main body to a topmost portion of the second recess, and $C \geq 0.4T$.

2. The ferrule according to claim 1, wherein,
when viewed from the lower surface of the ferrule main body, a corner between a front surface of the second recess and a first side of the second recess and a corner between the front surface of the second recess and a second side of the second recess are curved.

3. The ferrule according to claim 1, wherein a topmost surface of the second recess is substantially parallel to the lower surface of the ferrule main body.

4. The ferrule according to claim 1, wherein
a rear surface of the second recess is inclined with respect to the top surface of the ferrule main body such that a distance between a rearmost portion of the rear surface of the second recess and the top surface is smaller than a distance between a frontmost portion of the rear surface of the second recess and the top surface, and
the rear surface of the second recess is substantially parallel to a front surface of the first recess.

5. An optical-fiber-attached ferrule comprising:
a ferrule and an optical fiber, wherein a front end portion of the optical fiber is securely inserted into the ferrule,
wherein the ferrule comprises:
a ferrule main body having a front edge, a rear edge, a top surface and a lower surface;
a fiber insertion hole into which the front end portion of the optical fiber is inserted, wherein the fiber insertion hole extends into the ferrule main body from the rear edge of the ferrule main body;
a first recess provided in the top surface of the ferrule main body, the first recess comprising a reflection surface which is a rear surface of the first recess, wherein the reflection surface reflects light on an optical path between the front end portion of the optical fiber and a light emission-launch portion;
the light emission-launch portion provided in the lower surface of the ferrule main body;
a locating pin extending outward from the lower surface of the ferrule main body and disposed between the light emission launch portion and the front edge of the ferrule main body; and
a second recess provided in the lower surface of the ferrule main body and disposed between the light emission-launch portion and the locating pin,
wherein A is a distance from an axis line of the locating pin to the front edge of the ferrule main body, B is a distance from the axis line of the locating pin to a front surface of the second recess, and $0.7 \leq A/B \leq 1.3$; and
T is a height of the ferrule from the top surface of the ferrule main body to the lower surface of the ferrule main body, C is a depth of the second recess from the lower surface of the ferrule main body to a topmost portion of the second recess, and $C \geq 0.4T$.

6. A ferrule comprising:
a main body;
a fiber insertion hole extending into the main body from a rear edge of the main body;
a light emission-launch portion provided on a lower surface of the main body;
a first recess provided in a top surface of the main body, the first recess comprising a rear surface which is inclined with respect to the top surface of the main body, wherein light on an optical path within the main body between the fiber insertion hole and the light emission-launch portion is totally internally reflected at the rear surface of the first recess;
a locating pin extending from a lower surface of the main body and disposed between the light emission-launch portion and a front edge of the main body; and
a second recess provided in the lower surface of the main body and disposed between the light emission-launch portion and the locating pin,
wherein A is a distance from an axis line of the locating pin to the front edge of the ferrule main body, B is a distance from the axis line of the locating pin to a front surface of the second recess, and $0.7 \leq A/B \leq 1.3$; and
T is a height of the ferrule from the top surface of the ferrule main body to the lower surface of the ferrule main body, C is a depth of the second recess from the lower surface of the ferrule main body to a topmost portion of the second recess, and $C \geq 0.4T$.

7. The ferrule according to claim 6, wherein the first recess comprises a front surface which is inclined with respect to the top surface of the main body, the second recess comprises a rear surface which is inclined with respect to the lower surface of the main body, and the front surface of the first recess is substantially parallel to the rear surface of the second recess.

8. The ferrule according to claim 6, wherein the locating pin is a first locating pin and the ferrule further comprises a second locating pin extending from the lower surface of the main body and disposed between the light emission-launch portion and the rear edge of the main body.

9. The ferrule according to claim 8, wherein both the first locating pin and the second locating pin are substantially perpendicular to the lower surface of the main body.

* * * * *